United States Patent [19]
Lee et al.

[11] Patent Number: 5,373,443
[45] Date of Patent: Dec. 13, 1994

[54] METHOD FOR IMAGING WITH LOW FREQUENCY ELECTROMAGNETIC FIELDS

[75] Inventors: Ki H. Lee, Lafayette; Gan Q. Xie, Berkeley, both of Calif.

[73] Assignee: The Regents, University of California, Oakland, Calif.

[21] Appl. No.: 132,408

[22] Filed: Oct. 6, 1993

[51] Int. Cl.⁵ .......................... G01V 3/08; G01V 3/18
[52] U.S. Cl. ...................... 364/420; 324/338
[58] Field of Search ......... 364/420; 324/372, 334–344

[56] References Cited

U.S. PATENT DOCUMENTS

| | | | |
|---|---|---|---|
| 2,276,974 | 3/1942 | Howard | 324/334 |
| 4,742,305 | 5/1988 | Stolarczyk | 324/338 |
| 4,755,944 | 7/1988 | Glass | 324/372 |
| 4,875,015 | 10/1989 | Ward | 324/372 |
| 4,901,023 | 2/1990 | Vail, III | 324/372 |
| 5,068,917 | 11/1991 | Stolarczykz | 324/338 |

OTHER PUBLICATIONS

Ki Ha Lee and Gan Quan Xie, "A new approach to imaging with low-frequency electromagnetic fields", Geophysics, vol. 58, No. 6 (Jun. 1993), pp. 780–796.

Ki Ha Lee, Guimin Liu, and H. F. Morrison, "A new approach to modeling the electromagnetic response of conductive media", Geophysics, vol. 54, No. 9 (Sep. 1989), pp. 1180–1192.

V. V. Filatov "Construction of focusing transformation of transient electromagnetic fields", Soviet Geology and Geophysics, vol. 25, No. 5, pp. 89–95 (1984).

G. A. Isaev and V. V. Filatov, "Physicomathematical principles of visualization of nonstationary electromagnetic fields", Soviet Geology and Geophysics, vol. 22, No. 6, pp. 89–95 (1981).

M. Lavrent'ev, V. G. Romanov and S. P. Shishatski, "Ill-posed problems of mathematical physics and analysis", Nauka, vol. 64, pp. 250–252 (1980).

K. H. Lee, "A New approach to interpreting electromagnetic-sounding data", Lawrence Berkeley Laboratory, University of California, Annual Report 1988, Aug. 1989, pp. 24–27.

*Primary Examiner*—Donald E. McElheny, Jr.
*Attorney, Agent, or Firm*—Paul R. Martin; Kathleen S. Moss; Pepi Ross

[57] ABSTRACT

A method for imaging with low frequency electromagnetic fields, and for interpreting the electromagnetic data using ray tomography, in order to determine the earth conductivity with high accuracy and resolution. The imaging method includes the steps of placing one or more transmitters, at various positions in a plurality of transmitter holes, and placing a plurality of receivers in a plurality of receiver holes. The transmitters generate electromagnetic signals which diffuse through a medium, such as earth, toward the receivers. The measured diffusion field data H is then transformed into wavefield data U. The traveltimes corresponding to the wavefield data U, are then obtained, by charting the wavefield data U, using a different regularization parameter $\alpha$ for each transform. The desired property of the medium, such as conductivity, is then derived from the velocity, which in turn is constructed from the wavefield data U using ray tomography.

10 Claims, 5 Drawing Sheets

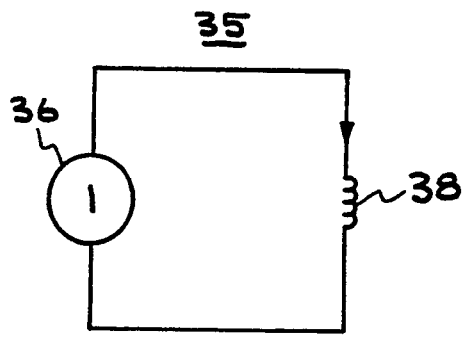
FIG. 3
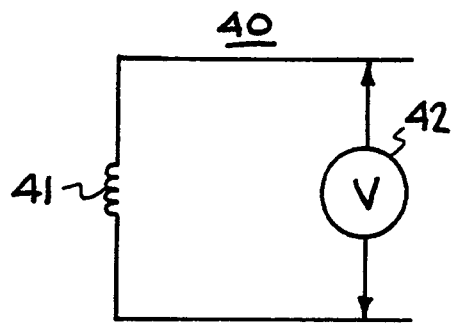
FIG. 4
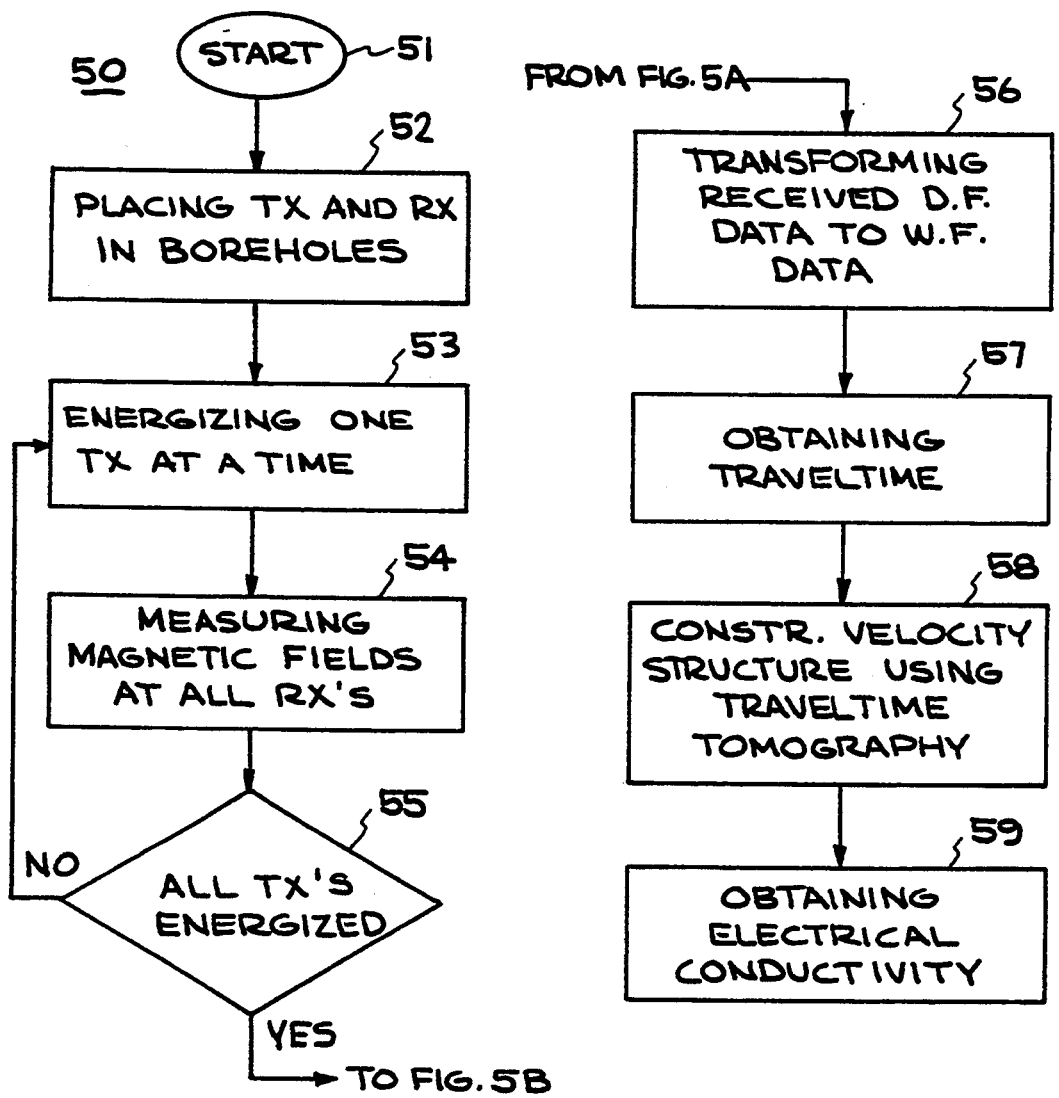
FIG. 5A
FIG. 5B $\alpha = 3.5612683028771d-10$ $\alpha = 1.4786175321655d-12$ $\alpha = 5.9401880195370d-07$

METHOD FOR IMAGING WITH LOW FREQUENCY ELECTROMAGNETIC FIELDS

STATEMENT OF GOVERNMENT RIGHTS

The United States Government has rights in this invention pursuant to Contract No. DE-AC03-76SF00098, between the United States Department of Energy and University of California.

BACKGROUND OF THE INVENTION

The present invention relates in general to imaging methods, and more particularly to a new method for imaging with low frequency electromagnetic fields, for interpreting the electromagnetic data using ray tomography, and for determining the earth conductivity with high accuracy and resolution.

Electrical conductivity of the earth is a very important factor in underground explorations, such as explorations for minerals, hydrocarbons and groundwater, and in analyzing environmental and crustal problems. Conventional methods approximate the electrical conductivity by using low frequency (less than 1 MHz) electromagnetic fields. The differential equation that describes the behavior of such electromagnetic fields is a diffusion equation, such that the inversion solution of the fields satisfying this equation is relatively difficult, particularly for complex models. There has been several attempts to resolve such diffusion equation.

Some of these attempts include earlier studies by G. Kunetz, "Processing and interpretation of magnetotelluric soundings", Geophysics, volume 37, pages 1005–1021 (1972); P. Weidelt, "The inverse problem of geomagnetic induction", Zeitung for Geophysiks, volume 38, pages 257–298 (1972); and S. Levy et al., "Subsurface imaging using magnetotelluric data", Geophysics, volume 53, pages 104–117 (1988). These studies nave shown a relationship between diffusion equations and wave equations, but have been limited to magnetotelluric problems in a layered earth.

Using equations for scalar fields, M. Lavrent'ev, V. G. Romanov and S. P. Shishatski, in "Ill posed problems of mathematical physics and analysis", Nauka, volume 64, pages 250–252 (1980), presented a mathematical transform. between fields satisfying the diffusion equation and its corresponding wave equation. Subsequently, G. A. Isaev, and V. V. Filatov, in "Physicomathematical principles of visualization of nonstationary electromagnetic fields", Geol. i Geofiz., volume 22, pages 89–95 (1981), and V. V. Filatov in "Construction of focusing transformation of transient electromagnetic fields", Soviet Geology and Geophysics, volume 25, No. 5, pages 87–93 (1984), tested the imaging concept, using controlled-source electromagnetic data, with limited success.

In yet another attempted solution, K. H. Lee, Gan Quan Xie, and H. F. Morrison, in an article entitled "A new approach to modeling the electromagnetic response of conductive media" Geophysics, volume 54, pages 1180–1192 (1989), generalized the transform to include vector electromagnetic fields and arbitrary sources.

Yet another study by K. H. Lee, in an article entitled "A new approach to interpreting electromagnetic-sounding data", Lawrence Berkeley Laboratory, Annual Report 1988, LBL-26362, pages 24–27, showed that the construction of the wavefield with reasonable resolution would require approximately four decades of time-domain, or frequency-domain data, with a maximum allowable noise in the power spectrum of about three percent (3%). However, useful information, such as the traveltime, would remain in the transformed wavefield, even if the time window is substantially reduced.

The foregoing attempts have met with varying degrees of success, in obtaining high resolution earth electrical conductivity distribution useful for underground explorations and environmental studies. However, no practically useful method has been proposed for high-resolution imaging of electrical conductivity using the wavefield transform technique.

Therefore, it would be highly desirable to have a new method for imaging with low frequency electromagnetic fields, via a wavefield transform and for determining the earth conductivity with high accuracy and resolution.

SUMMARY OF THE INVENTION

Therefore, it is an object of the present invention to provide a new method for high-resolution imaging of electrical conductivity with low-frequency electromagnetic fields, using wavefield transforms and ray tomography.

Briefly, the above and further objects and features of the present invention are realized by providing a new imaging method which includes the steps of placing one or more transmitters, at various positions in a plurality of transmitter holes, and placing a plurality of receivers at various positions in a plurality of receiver holes.

The transmitters generate electromagnetic signals which diffuse through a medium such as earth. These signals are measured by the receivers. A central processing unit would collect these measurements and transform the measured diffusion field data H into wavefield data U.

Traveltimes are estimated from the constructed wavefields. Using the traveltime data, a tomographic inversion is carried out to construct the velocity structure. Finally, the electrical conductivity is derived directly from the wavefield velocity.

BRIEF DESCRIPTION OF THE DRAWINGS

The above and other features of the present invention and the manner of attaining them, will become apparent, and the invention itself will be best understood, by reference to the following description and the accompanying drawings, wherein:

FIG. 3 is a schematic diagram of a transmitter circuit used in the imaging system of FIGS. 1 and 2;

FIG. 4 is a schematic diagram of a receiver circuit used in the imaging system of FIGS. 1 and 2;

FIGS. 5A and 5B illustrate a method for imaging with low-frequency electro-magnetic fields, by the imaging system of FIGS. 1 and 2, according to the present invention;

DETAILED DESCRIPTION OF THE PREFERRED EMBODIMENT

Figure 1:
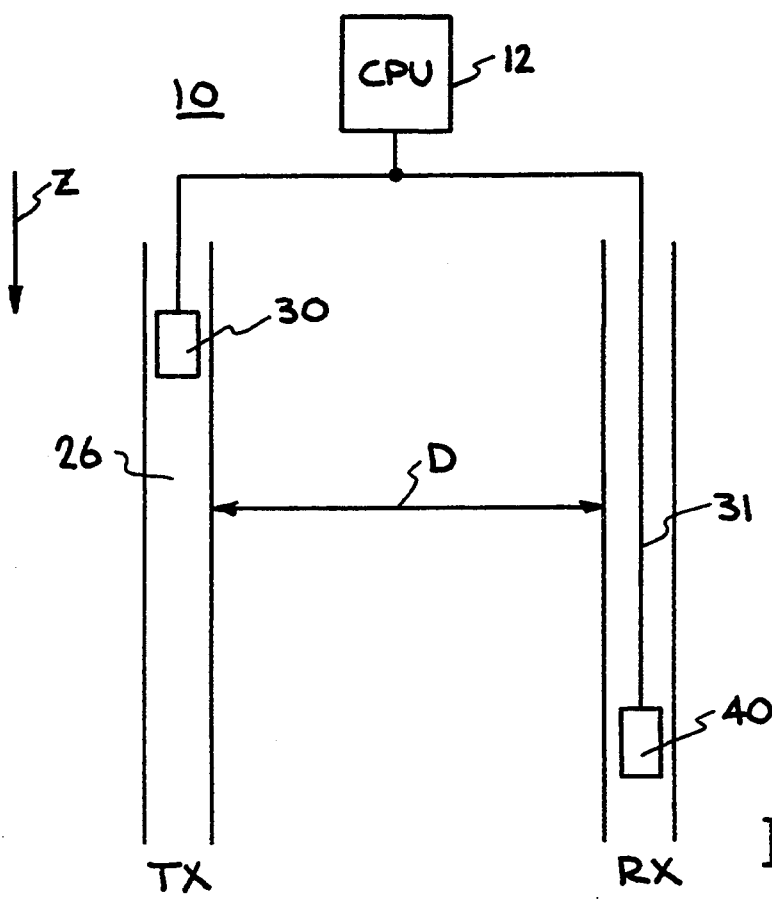
FIG. 1 is a schematic side elevational view of a simplified imaging system according to the present invention.
Figure 2:
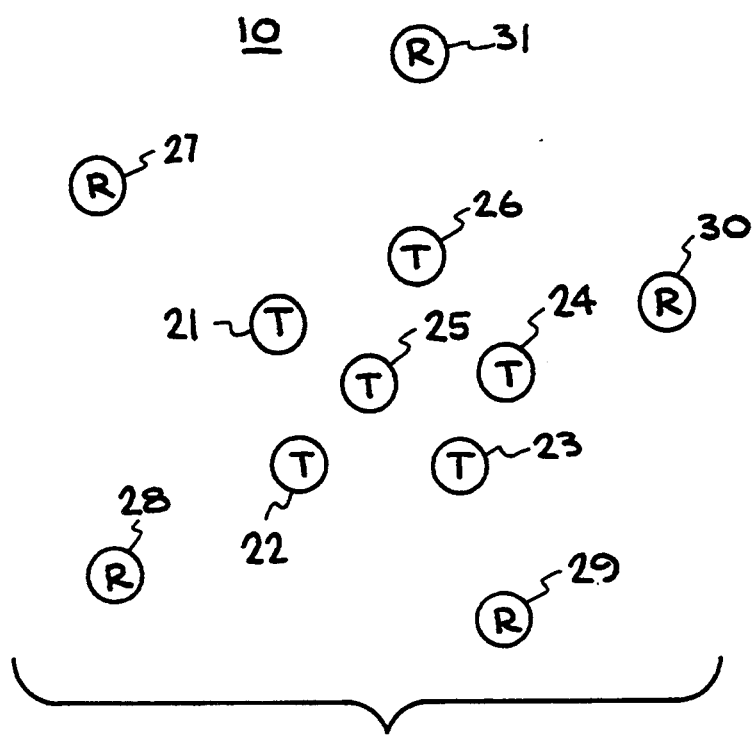
FIG. 2 is a simplified schematic top plan view (not to scale) of the imaging system of FIG. 1.
Figure 6A:
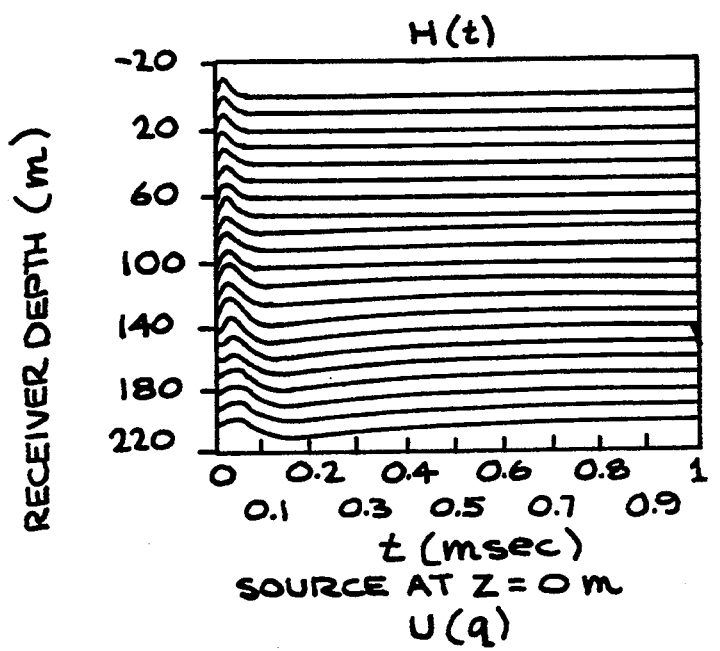
FIG. 6, chart (a) illustrates how a transformed wavefield propagates from the transmitter circuit of FIG. 3, to the receiver circuit of FIG. 4, at various receiver depths, along ray paths; and charts (b) through (f) illustrate the traveltimes at various regularization parameters $\alpha$.
Figure 6B:
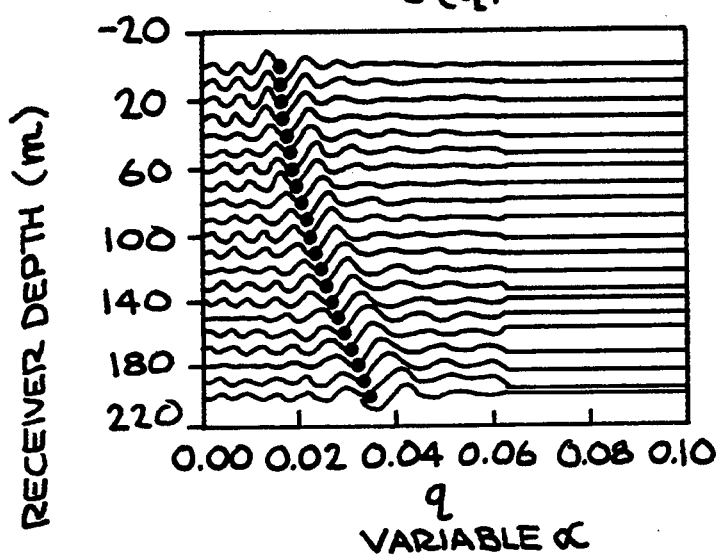
Figure 6C:
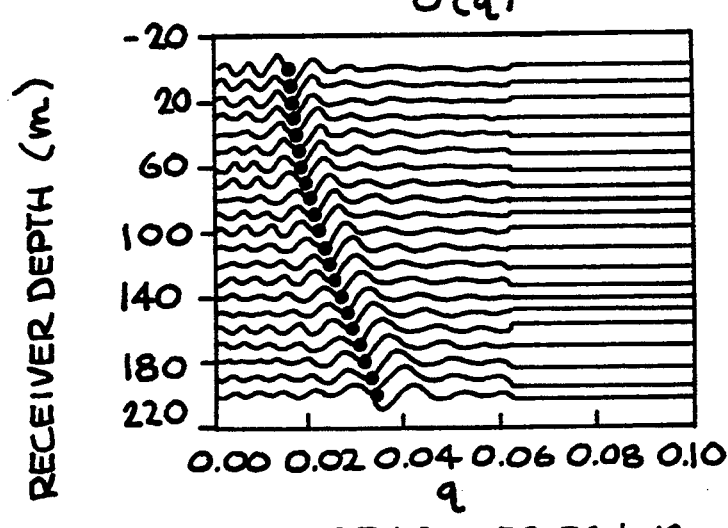
Figure 6D:
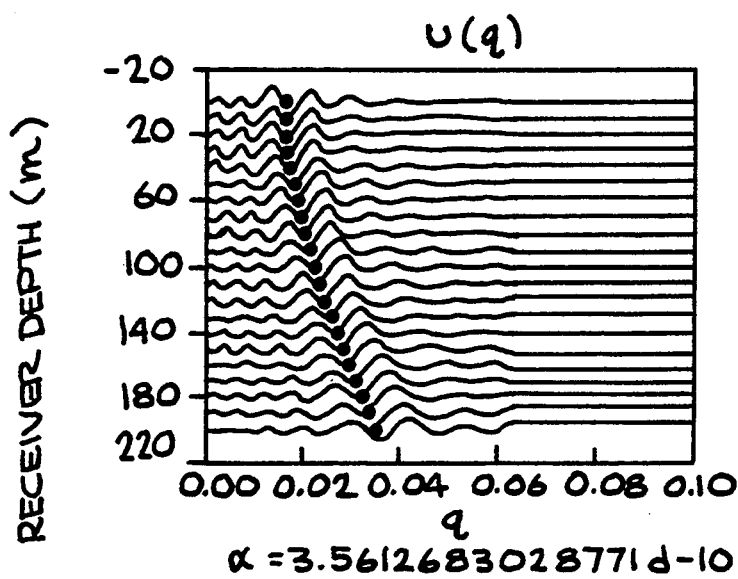
Figure 6E:
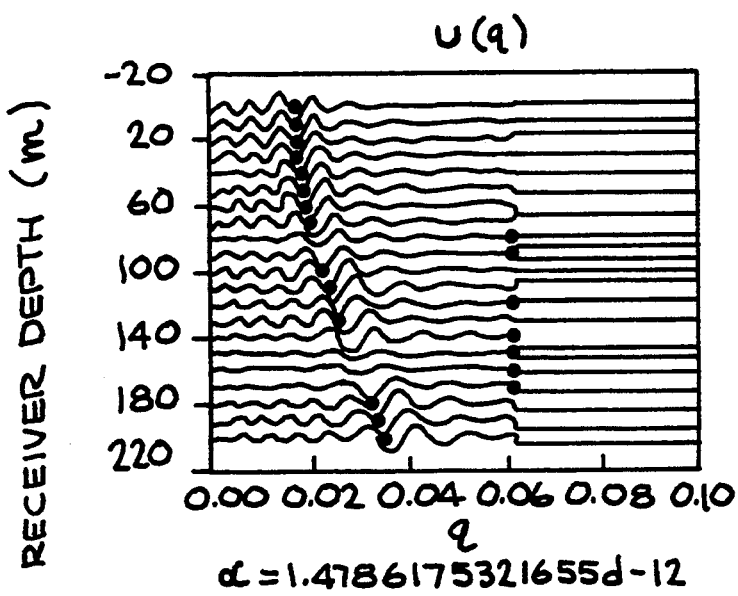
Figure 6F:
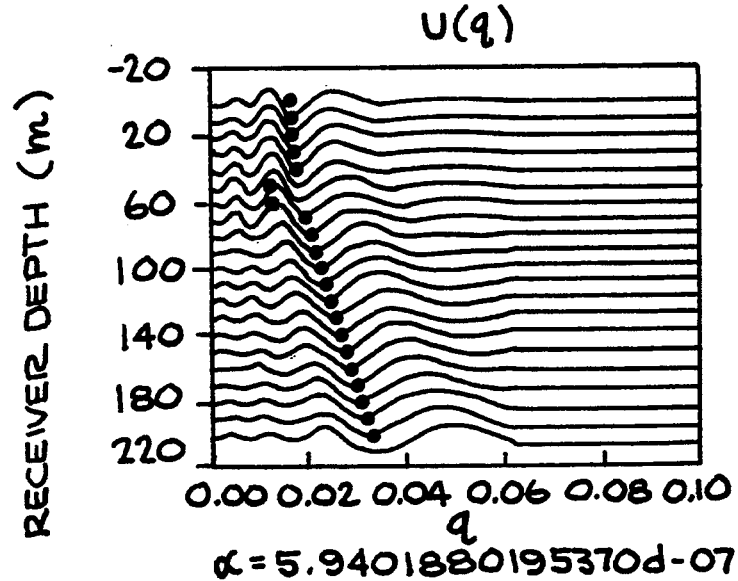

Turning now to the drawings, and more particularly to FIGS. 1 and 2 thereof, there is illustrated, respectively, a schematic side elevational view, and a schematic top plan view of a simplified imaging system 10, according to the present invention. Numerical simulations of nonlinear traveltime tomography have been carried out using the imaging system 10, with various slowness distributions.

The imaging system 10 includes a plurality of holes that are bored into the ground, within and around the area of interest, and is used to determine the conductivity of that area. These holes are generally divided into two types, transmitter holes, such as holes 21 through 26, and receiver holes, such as holes 27 through 31.

While FIG. 1 shows only one transmitter hole 28 and one receiver hole 31, and FIG. 2 shows six transmitter holes 21 through 26, and five receiver holes 27 through 31, it should be understood that any number of transmitter and receiver bore holes could be used, without departing from the scope of the invention.

The imaging system 10 further includes a plurality of transmitters or sources, similar to the transmitter 30. FIG. 3 is a circuit diagram of a simplified transmitter 35, and FIG. 4 is a circuit diagram of a simplified receiver 40. The transmitter 35 includes a current source 36, which is connected across an inductive circuit 38, such as a solenoid coil. The receiver 40 includes an inductive circuit 41, such as a solenoid coil, which is connected across a voltmeter 42.

The operation of the imaging system 10 is controlled and regulated by a central processing unit 12, and will now be summarily explained, in relation to FIGS. 5A and 5B. As illustrated by block 52 in FIG. 5A, a transmitter 30 is inserted at various positions along the length of a first transmitter hole 26. Additionally, a plurality of receivers, such as the receiver 40, are inserted at various positions along the length of the various receiver holes 27 through 31.

An electrical signal is generated by a first transmitter 30, and propagates, through a medium, such as ground, to the receivers in the receiver boreholes 27 through 31 (block 53). The magnetic field H is measured by these receivers, as indicated by block 54. Consequently, the CPU 12 inquires whether all the transmitters have been energized (block 55). If not, another transmitter is energized (block 53), and the magnetic field H measured at all the receivers (block 54).

Referring now to FIG. 5B, the process 50 is continued by the CPU 12. The measured diffusion field values H, are then transformed into wavefield data U, as indicated by block 56. This transformation is generally carried out by equation (3) below. traveltime is then obtained, at block 57, using FIG. 6, which will be described later. The velocity structure is then constructed at block 58 using traveltime tomography, by means of equation (111B), as it will explained later in much greater detail. The electrical conductivity a is then obtained directly from the constructed velocity at block 59.

In each homogeneous region, after dropping the displacement current, Maxwell's equations are reduced to equation (1A), for the magnetic field H.

$$\nabla^2 H(r,t) - \mu\sigma(r)\frac{\partial}{\partial t} H(r,t) = S(r,t), \tag{1A}$$

In the above equation (1A), S represents the source, which is expressed in term of J, the impressed current, by the following equation (1B):

$$S(r,t) = -\nabla \times J(r,t). \tag{1B}$$

By introducing the functions U(r,q) and F(r,q), where U is the wavefield, and F is the source S transformed to the wavefield domain, which are related by the following equation (2):

$$\nabla^2 U(r,q) - \mu\sigma(r)\frac{\partial^2}{\partial q^2} U(r,q) = F(r,q), \tag{2}$$

it can be shown that the magnetic field H and the wavefield U are uniquely related by the following equation (3), as illustrated by K. H. Lee et al.'s article entitled "A new approach to modeling the electromagnetic response of conductive media" (1989):

$$H(r,t) = \frac{1}{2\sqrt{\pi t^3}} \int_0^\infty q\, e^{-\frac{q^2}{4t}} U(r,q)\, dq. \tag{3}$$

At inhomogeneous boundaries different components of the magnetic field will couple, and the wavefield U obeys appropriate boundary conditions. The transform is exclusively between t and q, and is independent of the space variable r. For this reason, the spatial variable r will be dropped in the following analysis.

Equation (1A) is referred to as the diffusion equation, and equation (2) is referred to as the wave equation. One object of the present invention (or method) is to transform the diffusion field H to a wavefield U. This transformation is carried out using equation (3). The inverse solution, through the wavefield equation (2) provides a high resolution electrical conductivity.

Generally, the approach taken here is referred to as the "inverse" problem, since the data is available, and it is desired to find the properties of the medium, i.e. earth. In this case the property of interest is the electrical conductivity of earth.

Using equation (1A), alone, it would be difficult to obtain a high resolution electrical conductivity. The present inventive method includes transforming the diffusion field H to a wavefield U, and carrying out the inversion in the wavefield domain. The transformation equation (3), which is referred to as the integral transform equation, is solved numerically, as will be described below.

To construct the wavefield U from the magnetic field H, a numerical algorithm has been developed using the singular value decomposition. Using the trapezoidal integral formula and the collocation method, the integral equation (3) is expressed in a discrete form, in equation (4), as follows:

$$q_1 e^{-\frac{q_1^2}{4t_i}} (q_2 - q_1) U_1 + 2\sum_{j=2}^{m-1} q_j e^{-\frac{q_j^2}{4t_i}} (q_{j+1} - q_{j-1}) U_j + \tag{4}$$

$$q_m e^{-\frac{q_m^2}{4t_i}} (q_m - q_{m-1}) U_m = 8\sqrt{\pi t_i^3}\, H_i,$$

-continued for $i = 1, 2, \ldots, n$ $(n \geq m)$, where the discrete functions $H_i = H(t_i)$; $U_j = U(q_j)$; and $$q_j = (j-1) \Delta q; \quad t_i = \frac{(i-1)(t_b - t_a)}{n-1}.$$

$\Delta q$ is the increment in q for the wavefield, and $\{t_a, t_b\}$ is the time window occupied by the time-domain data. Equation (4) can be rewritten in a matrix form, as follows:

$$AU = H. \tag{5}$$

The matrix A may itself be expressed, as follows:

$$A = X \nabla V^T, \tag{6}$$

where the matrix $\nabla$ is diagonal including singular values, and matrices X and V are orthonormal. It is expected that the matrix $\nabla$ is "numerically" singular, and requires regularization. Consequently, the solution U becomes:

$$U = V(\nabla^2 + \alpha I)^{-1} \nabla X^T H, \tag{7}$$

where $\alpha$ is the regularization parameter, and I is an identity matrix of order m (see equation (4)).

The parameter $\alpha$ effectively controls the threshold singular value in equation (7). The parameter $\alpha$ is selected according to the quasi-optimality method proposed by Leonov, A. S., "The choice of regularization parameters by means of the quasi-optimality and ratio criteria", Soviet Math. Dokl. (1978) Accordingly, let:

$$\lambda_1 \leq \lambda_2 \leq \ldots \leq \lambda_p; \quad 1 \leq p \leq m,$$

be the numerically non-zero singular values in the diagonal matrix $\nabla$ Let $\{V_k; k=1,p\}$ be p columns of the matrix V corresponding to the above non-zero singular values; and be the corresponding non-zero members of $\nabla X^T H$ in equation (7), and let the norm $\eta$ be residual in the null space of A, $$\eta = \left\| A^T H - \sum_{k=1}^{p} u_k V_k \right\|.$$

By defining the following function:

$$\psi(\alpha) = \frac{\eta^2}{\alpha^2} + \alpha^2 \sum_{k=1}^{p} \frac{u_k}{(\alpha + \lambda_k^2)^4}, \tag{8}$$

Leonov's 1978 article above, showed that the regularization parameter $\alpha$, which results in the optimum solution to equation (7) is the smallest positive root of the stationary equation of this function, namely:

$$\Psi(\alpha) = 0. \tag{9}$$

The parameter $\alpha$ depends on the data H (see equation (8)). When the data is noisy, the regularization parameter $\alpha$ will increase, resulting in smoother wavefield solution with a decreased resolution.

Briefly, once the diffusion H is transformed to a wavefield U, inversion is carried out in the wavefield domain. In solving equation (3) above, the object is to solve the wavefield U. Therefore, the first consideration is to transform the diffusion field H to a wavefield U. The second consideration according to the inventive method 50, is to process the wavefield U, once it has been defined.

Hence, an important feature of the present invention is the ability in relating the traveltime and the electrical conductivity. The traveltime is the time for a wavefield to travel from a source or transmitter, to a receiver or a measuring device. When the wavefield travels through the medium, the velocity of the travelling wavefield U, is equal to the inverse of the square root of the electrical conductivity $\sigma$, times the magnetic permeability $\mu$, as shown in the following equation (10A):

$$v = \frac{1}{\sqrt{\sigma \mu}} \tag{10A}$$

For all practical purposes, the magnetic permeability $\alpha$ is equal to that of free space, and is constant. So, the conductivity $\sigma$ is expressed equation (10B) as follows:

$$\sigma = \frac{1}{v^2 \mu} \tag{10B}$$

The present inventive method 50 resolves the foregoing equation (10B), and determines the values of the velocity v, using traveltime tomography. The basis of traveltime tomography is Fermat's principle, as illustrated in equation (11B) below.

As mentioned previously, the foregoing equation (10A) shows that the velocity v of the wavefield in the wavefield domain is inversely proportional to the square root of the conductivity $\sigma$. Consequently, the slowness is proportional to the square root of the conductivity $\sigma$. The traveltimes are inverted for the slowness distribution using a non-linear iterative tomographic algorithm. Each iteration includes two main parts. The first part determines raypaths for a given slowness model. The second part updates the slowness model using the raypaths computed in the first part. The updating algorithm uses a regularization scheme based on mixed constraints.

FIG. 6 illustrates six charts, which are labeled (a) through (f), from which the traveltimes are obtained. The scale of experiments depends on the specific application and its objectives. In this example, the length of the transmitter and receiver boreholes is 200 meters. The transmitter and receiver boreholes are separated by a distance of about 100 meters. Both the transmitter and receiver assume various positions, starting at Z=0, in their respective boreholes. The sampling interval used for this illustration is 10 meters. Chart (a) shows transient magnetic fields at twenty-one (21) receiver positions due to a magnetic dipole source at z=0. Chart (b) shows transformed wavefields using a different regularization parameter $\alpha$ for each transform.

Chart (c) shows wavefields using the smallest regularization parameter $\alpha$ among those calculated and used in chart (b). Chart (d) shows wavefields using the largest regularization parameter $\alpha$. Chart (e) shows wavefields using a regularization parameter $\alpha$ less than the smallest. Chart (f) shows wavefields using a regularization parameter e larger than the largest one used in chart (d). The parameters used are listed under each chart, except for chart (b). Amplitudes have been normalized by the maximum absolute value of each traces. Plots are all in linear scales and the amplitude is positive in the downward direction.

Figure 7:
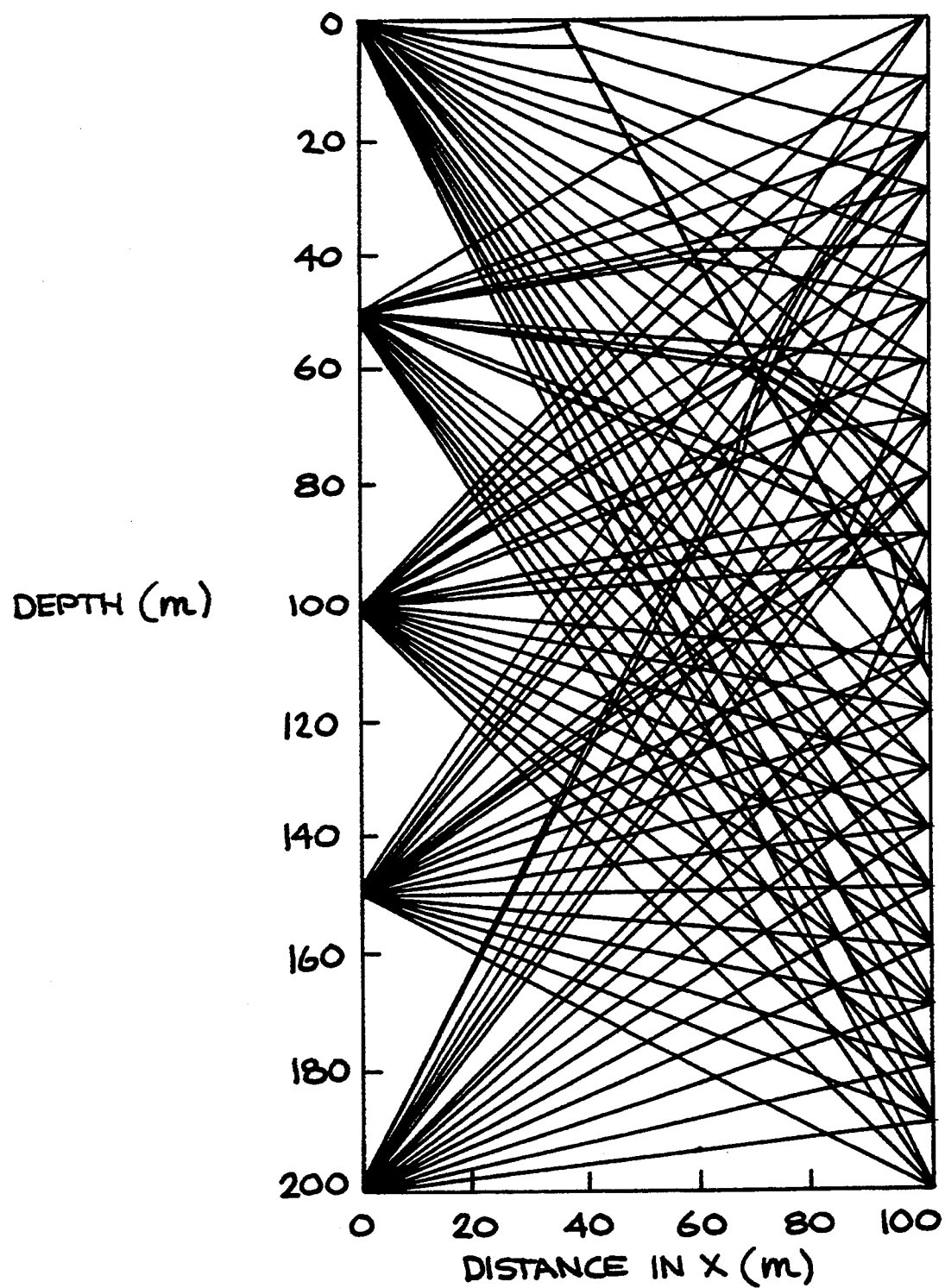
FIG. 7 illustrates various wavefield ray paths.

FIG. 7 illustrates various wavefield ray paths. For illustration purpose, a two-dimensional slowness model will be used, having a rectangular grid of NT nodes (NT=NX×NZ). Let $u_j$ be the discretized slowness at the jth node of the model. Then the slowness at any point can be written as equation (11A), as follows:

$$u(x,z) = \sum_{j=1}^{NT} p_j(x,z) \, u_j, \tag{11A}$$

where $p_j(x,z)$ is the interpolation basis function. Assuming that the slowness is piece-wise linear in x and cubic-spline continuous in z. In such a medium, the ray is smooth and can bend continuously. Also, the raypath from point a to point b should be such that its traveltime $q_{ab}$ satisfies Fermat's principle:

$$q_{ab} = \int_a^b u(x,z) dl = \int_a^b u(x,z) \sqrt{dx^2 + dz^2} = \min. \tag{11B}$$

Here dl is the arc length along which the wavefield propagates. Based on this principle, a simple raypath equation is derived as follows. First, along the horizontal interval it is assumed that:

$$x_1 < x_2 < \ldots < x_i < \ldots < x_{NX-1} < x_{NX}.$$

The discrete form of Fermat's principle, equation (11B), can then be written as follows:

$$\sum_{i=1}^{NX-1} \frac{\sqrt{(x_{i+1} - x_i)^2 + (z_{i+1} - z_i)^2}}{x_{i+1} - x_i} \times$$

$$\int_{x_i}^{x_{i+1}} \left[ u(x_i,z_i) \frac{x_{i+1} - x}{x_{i+1} - x_i} + u(x_{i+1},z_{i+1}) \frac{x - x_i}{x_{i+1} - x_i} \right] dx = \min,$$

or, after integrations in x $$\frac{1}{2} \sum_{i=1}^{NX-1} [u(x_i,z_i) + \tag{12}$$

$$u(x_{i+1},z_{i+1})] \sqrt{(x_{i+1} - x_i)^2 + (z_{i+1} - z_i)^2} = \min.$$

In this equation $u(x_i,z_i)$ represents the slowness for fixed $x = x_i$, but the value is the result of cubic spline interpolation of the function $u(x_i, z_i)$ at $z = z_i$. Note that, since $u(x_i, z_i)$ needs to be single valued, rays can move only in the positive x-direction, and there are no turning rays.

The traveltime $q_{ab}$ given by equation (12) is positive. The stationary condition for this function can be found by taking derivatives of equation (12) with respect to $z_i$ and $z_{i+1}$, respectively, and canceling them.

$$\frac{\partial u(x_i,z_i)}{\partial z_i} \sqrt{(x_{i+1} - x_i)^2 + (z_{i+1} - z_i)^2} -$$

$$[u(x_i,z_i) + u(x_{i+1},z_{i+1})] \frac{z_{i+1} - z_i}{\sqrt{(x_{i+1} - x_i)^2 + (z_{i+1} - z_i)^2}} = 0,$$

-continued $$\frac{\partial u(x_{i+1},z_{i+1})}{\partial z_{i+1}} \sqrt{(x_{i+1} - x_i)^2 + (z_{i+1} - z_i)^2} +$$

$$[u(x_i,z_i) + u(x_{i+1},z_{i+1})] \frac{z_{i+1} - z_i}{\sqrt{(x_{i+1} - x_i)^2 + (z_{i+1} - z_i)^2}} = 0,$$

$$i = 1, 2, 3, \ldots, NX - 1$$

which can be assembled, by adding two adjacent terms:

$$F_i = \frac{\partial u(x_i,z_i)}{\partial z_i} \left[ \sqrt{(x_i - x_{i-1})^2 + (z_i - z_{i-1})^2} + \right. \tag{13}$$

$$\left. \sqrt{(x_{i+1} - x_i)^2 + (z_{i+1} - z_i)^2} \right] +$$

$$[u(x_i,z_i) + u(x_{i-1},z_{i-1})] \frac{z_i - z_{i-1}}{\sqrt{(x_i - x_{i-1})^2 + (z_i - z_{i-1})^2}} -$$

$$[u(x_i,z_i) + u(x_{i+1},z_{i+1})] \frac{z_{i+1} - z_i}{\sqrt{(x_{i+1} - x_i)^2 + (z_{i+1} - z_i)^2}} = 0;$$

$$i = 2, 3, \ldots, NX - 1,$$

with the boundary condition:

$$z_1 = z(x_1), \quad z_{NX} = z(x_{NX}). \tag{14}$$

Equation (13) is the nonlinear equation from which the following Newton iteration scheme is derived. First, the function $F^{(k)} = [F2^{(k)}, F3^{(k)}, \ldots, F_{NX-1}^{(k)}]^T$ is changed by:
$$z^{(k+1)} = z^{(k)} + \delta_z,$$

where $z^{(k)} = [z_2^{(k)}, z_3^{(k)}, \ldots, z_{NX-1}^{(k)}]^T$, and the superscript $(k)$ indicates kth iteration. Then, the first order approximation of the function $F^{(k+1)}$ to this perturbation results in the following system of linear equations for the increment $\delta z$.

$$J^{(k)} \delta z = -F^{(k)}, \tag{15}$$

where elements $(J_{ij}^{(k)})$ of the Jacobian matrix J is given by $$J_{ij}^{(k)} = \frac{\partial F_i^{(k)}}{\partial z_j^{(k)}},$$

and, the corresponding boundary condition (14) is reduced to $$\delta z_1 = 0, \quad \delta z_{NX} = 0. \tag{16}$$

The Jacobian matrix J includes second-order derivatives of the slowness $u(x_i,z)$ with respect to z. Since spline functions are the basis functions in z for $p_j(x,z)$ in equation (11A), the second-order derivatives are continuous. The matrix J is tri-diagonal and symmetric.

Assuming that there are NS source (or transmitter) positions along the length of the transmitter borehole, and NR receiver positions along the length of the receiver borehole, the total number of raypaths (or source-receiver pairs) is NTR=NS×NR. Further assuming that these raypaths have just been updated using equation (15), let $p_i$ be the Fermat raypath connecting the ith source-receiver pair, equation (11B) becomes:

$$\int_{p_i} u(x,z) dl = q_i, \quad i = 1, 2, \ldots, NTR, \quad (17)$$

It should be noted that this equation (17) is different from equation (11B) in that the raypath is now known, and the unknown is the slowness $u(x,z)$. Let $l_{ij}$ be the segment of the ith ray through the jth cell. Then the discrete form of equation (17) becomes:

$$\sum_{j=1}^{NE} l_{ij} u_j = q_i, \quad i = 1, 2, \ldots, NTR. \quad (18)$$

In the foregoing equation (17), $NE = (NX-1) \times (NZ-1)$ and represents the total number of cells between boreholes. Equation (18) can now be expressed in a matrix form, as follows:

$$Mu = q, \quad (19)$$

where $u = (u_1, u_2, \ldots, u_{NE})^T$, and $q = (q_1, q_2, \ldots, q_{NTR})^T$. The ray matrix $M$ includes elements $l_{ij}$, but most of these elements are zeros. Equation (19) is nonlinear, since these elements are functions of the slowness model used in the previous calculation. The traveltime data are not sensitive to changes in the slowness model. Numerical solution to this type of problems can be obtained using a regularization scheme.

Unlike seismic applications, however, where the velocity contrast seldom exceeds 50 percent, the transformed wavefield is subject to much higher slowness (or velocity) contrasts. This is because the electrical conductivity varies over several orders of magnitude in typical rocks. The following functional equation has been tested successfully for high contrast slowness models:

$$(Mu - q)^T W(Mu - q) + \mu u^T Du - \quad (20)$$

$$r \sum_{j=1}^{NE} \ln(u_j) + \sum_{i=1}^{NTR} \frac{\left\{ \min\left[0, \left(\sum_{j=1}^{NE} l_{ij} u_j - q_i\right)\right] \right\}^2}{2r} = \min,$$

where the diagonal matrices $W$ and $D$ are added for the purpose of weighting and damping, respectively. The elements of these diagonal matrices are:

$$W_{ii} = \sum_{j=1}^{NE} l_{ij} u_j, \quad i = 1, 2, \ldots, NTR,$$

$$D_{kk} = \sum_{j=1}^{NE} \frac{l_{kj}}{u_j}, \quad k = 1, 2, \ldots, NE.$$

The parameter r is used to relax constraints, and is usually small. The term $\ln(u_j)$ included in the functional equation (20) ensures that the slowness is positive. The constant $\mu$ is the global regularization parameter. The construction of this particular type of functional equation with mixed constraints, is based on the article "Nonlinear Programming: Sequential Unconstrained Minimization Techniques", by Fiacco, A. V., and McCormick, G. P. (1968). Minimization of this functional equation results in the following equation (21):

$$\nabla (Mu)^T W(Mu - q) + \mu Du - \quad (21)$$

-continued $$rE_c + \sum_{i=1}^{NTR} \frac{\min\left[0, \left(\sum_{j=1}^{NE} l_{ij} u_j - q_i\right)\right]}{r} \nabla (Mu)_i = 0.$$

The column vector $E_c$ on the right side of this equation, is defined as $E_c = [u^{-1}1, u^{-1}2, \ldots, u^{-1}NE]^T$. With the relationship:

$$\nabla (Mu) = M + (\nabla M) u,$$

equation (21) may be rewritten as:

$$(u^T \nabla M^T + M^T) W(Mu - q) + \mu Du$$
$$- rE_c + r^{-1}(u_v^T \nabla M_v^T + M_v^T) W_v (M_v u_v - q_v) = 0. \quad (22)$$

Here, $M_v$ is defined as a submatrix of $M$, and it includes $v$ rows of ray elements, whose contributions are such that the resulting traveltime violates the Fermat constraint, i.e., $$\sum_{j=1}^{NE} l_{ij} u_j < q_i, \quad i = 1, 2, \ldots, v.$$

If the solution were to converge, the size of this submatrix should decrease, as iteration is continued. In actual computations the derivatives of the ray matrix $M$ with respect to individual slowness $u_j$, in equation (22), have not been used because they are complex to compute. This information, however, may be important for a better convergence.

A Newton iteration scheme for the slowness is now established using equation (22). Upon introducing a perturbation $\delta u$, equation (22) could be broken into the following system of linear equations:

$$(M^T WM + \mu D + rE^2 + R^{-1} M_v^T W_v M_v) \delta U =$$
$$M^T W q - Mu^{(k)} - \mu Du^{(k)} + rE_c +$$
$$r^{-1} M_v^T W_v [q_v - M_v u_v^{(k)}]. \quad (23)$$

Here, E is a diagonal matrix including entries $\{u^{-1}1; i = 1, 2, \ldots, NE\}$. The superscript (k) indicates kth iteration.

For a given global regularization parameter $\mu$, an optimum slowness model is sought through iterations. Each iteration includes updating (a) the slowness model by using equation (23); and (b) all raypaths using equation (15) based on the new slowness model. System matrices M and J are also continuously modified in this process. When a point is reached where the perturbation $\delta u$ becomes less than a prescribed tolerance, we proceed to the next step and update the global parameter.

In deriving equation (23), the following approximation is made:

$$\nabla (Mu) = M + (\nabla M)u \approx M; \text{ with } \nabla M \approx 0.$$

As a result, equation (23) is not an ordinary Newton iteration for solving the nonlinear equation (21). The regularization parameter $\mu$, which is introduced in equation (20), is intended to reduce the effect of this approximation. The parameter $\mu$ is selected according to a scheme called the discrepancy principle (Leonov, 1979).

While particular embodiments of the present invention have been disclosed, it is to be understood that various different modifications are possible and are contemplated within the scope of the specification, drawings, abstract and appended claims.

What is claimed is:

1. A method for imaging with electromagnetic fields having frequencies of less than about 1 MHz, comprising the steps of:
   a) placing a transmitter means at various positions along the length of at least one transmitter hole;
   b) placing a receiver means at various positions along the length of at least one receiver hole;
   c) said transmitter means generating an electromagnetic signal, said electromagnetic signal diffusing through a medium, to said receiver means, in said at least one receiver hole;
   d) measuring the diffusion field received by said receiver means;
   e) transforming said measured diffusion field data into wavefield data U;
   f) obtaining traveltimes corresponding to said wavefield data U; and
   g) deriving the desired property of the medium from said wavefield data U.

2. The imaging method according to claim 1, wherein said step of deriving the desired property of the medium includes the step of constructing a velocity structure from said wavefield data U, and then deriving the conductivity from the velocity structure.

3. The imaging method according to claim 2, wherein the desired medium property is conductivity distribution.

4. The imaging method according to claim 3, wherein said transmitter means includes a plurality of transmitters.

5. The imaging method according to claim 4, wherein said receiver means includes a plurality of receivers.

6. The imaging method according to claim 4, wherein a processing means sequentially energizes each one of said plurality of transmitters, and measures the diffusion field H at each one of said receivers.

7. The imaging method according to claim 3, wherein said step of transforming said measured diffusion field data into wavefield data U includes the step of using and solving the following equation:

$$H(r,t) = \frac{1}{2\sqrt{\pi t^3}} \int_0^\infty q\, e^{-\frac{q^2}{4t}} U(r,q)\, dq.$$

8. The imaging method according to claim 3, wherein said step of obtaining traveltimes corresponding to said wavefield data U includes the step of charting said wavefield data U using a different regularization parameter $\alpha$ for each transform.

9. The imaging method according to claim 2, wherein said step of constructing the velocity structure includes the step of using and solving the following equation:

$$q_{ab} = \int_a^b u(x,z)dl = \int_a^b u(x,z)\sqrt{dx^2 + dz^2} = \min.$$

10. The imaging method according to claim 9, wherein when the wavefield propagates through the medium, the velocity of the travelling wavefield is equal to the inverse of the square root of the electrical conductivity $\sigma$, times the magnetic permeability $\mu$, as shown in the following equation:

$$v = \frac{1}{\sqrt{\sigma\mu}}.$$

* * * * *